(12) United States Patent
Thanikachalam

(10) Patent No.: US 11,962,504 B2
(45) Date of Patent: Apr. 16, 2024

(54) IDENTIFICATION OF ROUTE-MAP CLAUSES USING PREFIX TREES

(71) Applicant: VMware LLC, Palo Alto, CA (US)

(72) Inventor: Naveen Thanikachalam, Bangalore (IN)

(73) Assignee: VMware LLC, Palo Alto, CA (US)

(*) Notice: Subject to any disclaimer, the term of this patent is extended or adjusted under 35 U.S.C. 154(b) by 176 days.

(21) Appl. No.: 16/568,278

(22) Filed: Sep. 12, 2019

(65) Prior Publication Data
US 2021/0036956 A1 Feb. 4, 2021

(30) Foreign Application Priority Data

Jul. 30, 2019 (IN) .............................. 201941030701

(51) Int. Cl.
*H04L 45/748* (2022.01)
*H04L 61/255* (2022.01)

(52) U.S. Cl.
CPC .......... *H04L 45/748* (2013.01); *H04L 61/255* (2013.01)

(58) Field of Classification Search
None
See application file for complete search history.

(56) References Cited

U.S. PATENT DOCUMENTS

| | | | | |
|---|---|---|---|---|
| 6,141,738 A * | 10/2000 | Munter | ................ | H04L 61/255 711/216 |
| 6,563,823 B1 * | 5/2003 | Przygienda | .............. | H04L 45/02 370/392 |
| 7,392,349 B1 * | 6/2008 | Mathur | ................ | G11C 15/00 711/108 |
| 7,936,764 B1 * | 5/2011 | Krishnan | ................ | H04L 45/54 370/395.31 |
| 8,701,179 B1 * | 4/2014 | Penno | ..................... | H04L 63/02 709/227 |
| 8,811,158 B1 * | 8/2014 | Addepalli | ............... | H04L 45/28 370/225 |
| 2002/0184221 A1 * | 12/2002 | Ahmad | ................. | H04L 45/745 |
| 2004/0032937 A1 * | 2/2004 | Brady | ................... | H04M 15/07 379/115.03 |
| 2004/0052251 A1 * | 3/2004 | Mehrotra | ................ | H04L 45/54 370/252 |
| 2004/0085961 A1 * | 5/2004 | Coffell | ..................... | H04L 45/22 370/408 |
| 2005/0220123 A1 * | 10/2005 | Wybenga | ................ | H04L 45/60 370/400 |
| 2012/0127997 A1 * | 5/2012 | Zinjuwadia | ........... | H04L 45/745 370/392 |
| 2013/0034096 A1 * | 2/2013 | Hu | .......................... | H04L 45/54 370/389 |

(Continued)

*Primary Examiner* — Edan Orgad
*Assistant Examiner* — Emmanuel K Maglo
(74) *Attorney, Agent, or Firm* — Quarles & Brady LLP

(57) ABSTRACT

Described herein are systems and methods to apply route-map configurations in a computing network. In one implementation, a routing computing system may identify a route for redistribution in a computing network and identify a longest prefix in a radix tree associated with the route. The routing computing system may further identify a highest priority route-map clause associated with the longest prefix match or any parent prefixes of the longest prefix match in the radix tree. Once identified, the computing system may perform an action associated with the highest priority route-map clause.

20 Claims, 6 Drawing Sheets

(56) References Cited

U.S. PATENT DOCUMENTS

| | | | |
|---|---|---|---|
| 2014/0122791 A1* | 5/2014 | Fingerhut | G11C 15/00 |
| | | | 711/108 |
| 2014/0169365 A1* | 6/2014 | Sundaram | H04L 12/42 |
| | | | 370/357 |
| 2014/0358886 A1* | 12/2014 | Westlund | H04L 45/74 |
| | | | 707/708 |
| 2016/0087936 A1* | 3/2016 | Akyurek | H04L 61/2015 |
| | | | 709/226 |
| 2016/0277297 A1* | 9/2016 | Chang | H04L 45/54 |
| 2019/0005045 A1* | 1/2019 | Natal | G06F 16/90344 |
| 2019/0280969 A1* | 9/2019 | Liu | H04L 45/48 |
| 2020/0344166 A1* | 10/2020 | Roberts | H04L 49/70 |

\* cited by examiner

| | |
|---|---|
| RM SEQ 1 | LIST VALUE 312 | DENY |
| RM SEQ 2 | LIST VALUE 311 | DENY |
| RM SEQ 3 | LIST VALUE 314 | DENY |
| RM SEQ 4 | LIST VALUE 313 | DENY |
| RM SEQ 5 | LIST VALUE 310 | PERMIT |

| | |
|---|---|
| PREFIX 110 | LIST VALUE 310 |
| PREFIX 111 | LIST VALUE 311 |
| PREFIX 112 | LIST VALUE 312 |
| PREFIX 113 | LIST VALUE 313 |
| PREFIX 114 | LIST VALUE 314 |

IDENTIFICATION OF ROUTE-MAP CLAUSES USING PREFIX TREES

RELATED APPLICATIONS

Benefit is claimed under 35 U.S.C. 119(a)-(d) to Foreign Application Serial No. 201941030701 filed in India entitled "IDENTIFICATION OF ROUTE-MAP CLAUSES USING PREFIX TREES", on Jul. 30, 2019, by VMWare, Inc., which is herein incorporated in its entirety by reference for all purposes.

BACKGROUND

Route redistribution is a process that allows a network to use a routing protocol to dynamically route traffic based on information learned from a different routing protocol. These protocols may include Open Shortest Path First (OSPF), Routing Information Protocol (RIP), Enhanced Interior Gateway Routing Protocol (EIGRP), or some other routing protocol. For example, route redistribution may be used to advertise routing information associated with a first network that uses OSPF to a second network that uses EIGRP.

To selectively manage the routes that are available for redistribution between the networks, a route-map may be maintained by the routing device or routing computing system coupling the different networks. A route-map defines which of the routes from a routing protocol are allowed to be redistributed in the target routing process. A route-map includes an ordered sequence of statements or clauses that each define a permit or deny result. For example, a first clause may permit a route associated with a first prefix, while a second clause may deny a route associated with a second prefix.

Although route-maps provide an effective prioritized or sequenced list of what routes can be redistributed for a routing element, the process of traversing the sequenced list can lead to inefficiencies in determining whether or not a route is to be permitted or denied. In particular, inefficiencies may exist for routes that correspond to clause that is later in the sequence of clauses or for routes that may correspond to multiple different clauses.

OVERVIEW

The technology disclosed herein enhances the management and application of route-maps for a computing network. In one implementation, a routing computing system may identify a route for redistribution in a computing network. Once identified, the computing system may determine a longest prefix in a radix tree associated with the route and identify a highest priority route-map clause associated with the longest prefix match or any parent prefixes of the longest prefix match in the radix tree. After identifying the highest priority route-map clause, the computing system may permit or deny the route based on the highest priority route-map clause.

BRIEF DESCRIPTION OF THE DRAWINGS

FIG. 3 illustrates a prefix-list configuration according to an implementation.

FIG. 4 illustrates a route-map configuration according to an implementation.

DETAILED DESCRIPTION

Figure 1:
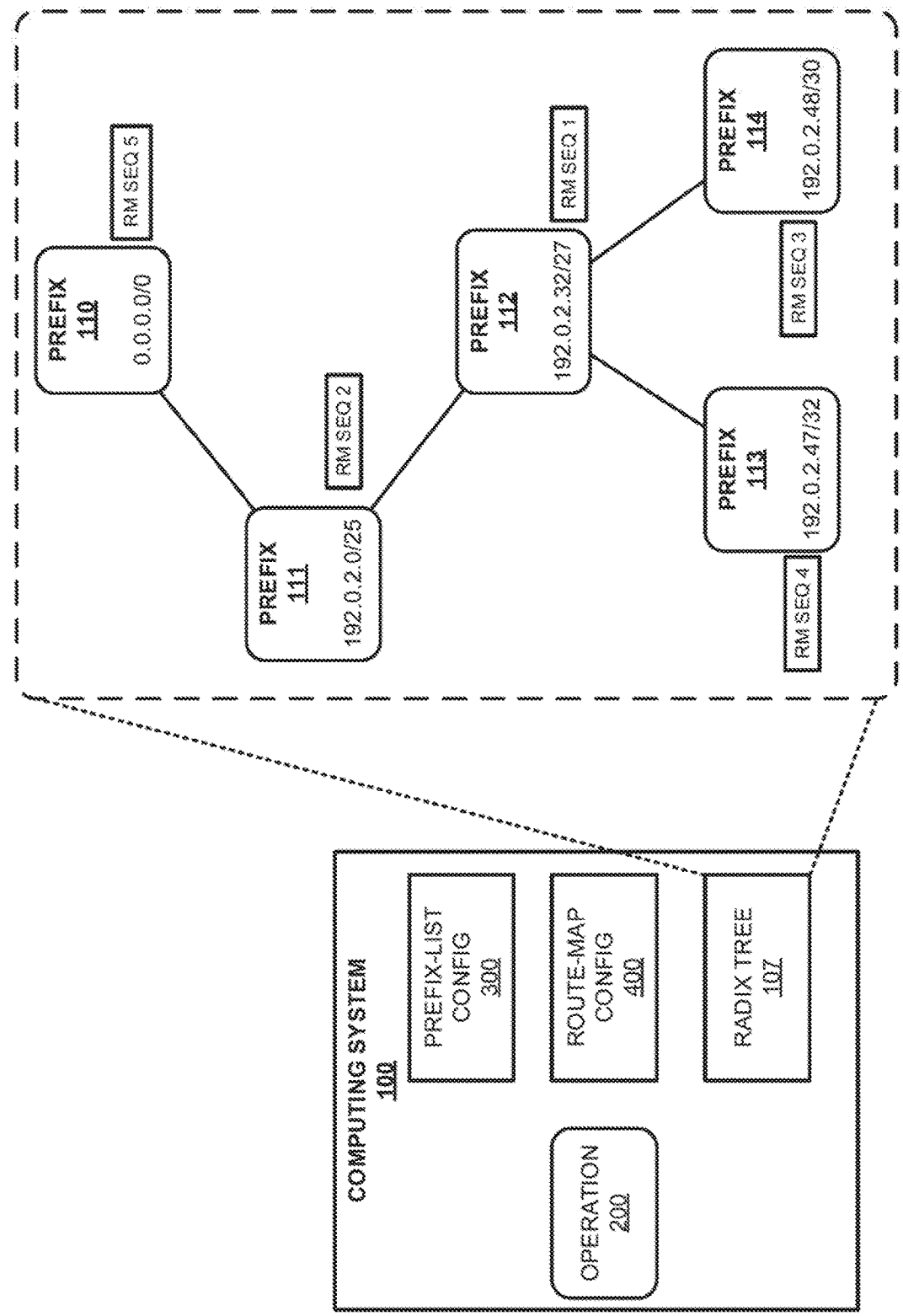
FIG. 1 illustrates a computing system to apply a route-map configuration according to an implementation.

FIG. 1 illustrates a computing system 100 to apply a route-map configuration according to an implementation. Computing system 100 includes prefix-list configuration 300, route-map configuration 400, radix tree 107, and operation 200. Operation 200 is further described in FIG. 2 below, prefix-list configuration 300 is further described in FIG. 3 below, and route-map 400 is further described in FIG. 4 below. Radix tree 107 includes prefixes 110-114, which are representative of internet protocol (IP) address prefixes for determining whether routes should be permitted or denied during route redistribution.

Computing system 100 is representative of a routing device capable of redistributing routes in an Open Shortest Path First (OSPF), Routing Information Protocol (RIP), or some other protocol routing process. In determining how routes should be distributed by computing system 100, computing system 100 may be provided with route-map configuration 400 that defines an ordered sequence or prioritized list of route-map clauses on how various routes should be handled. In some implementations, each clause in the route-map configuration may indicate at least a prefix and action to be taken when the prefix is identified (i.e., permit or deny). Additionally, each of the clauses is associated with a sequence value or priority value that indicates what action should be taken over another conflicting action. For example, an internet protocol (IP) address may match prefixes of multiple clauses. To define which of the clauses should apply to the IP address, route-map configuration 400 may include priority values that indicate which of the clauses should take precedence over other clauses in the configuration.

Here, in addition to route-map configuration 400, computing system 100 further includes prefix-list configuration 300 that can include a list of prefixes and corresponding identifier values associated with each of the prefixes. In some implementations, clauses in route-map configuration 400 may use the identifier values in place of the associated prefixes. Thus, rather than referencing a prefix address, route-map configuration may use an identifier value associated with the corresponding prefix. However, while demonstrated with a separate prefix-list, it should be understood that a route-map configuration may reference IP address prefixes directly.

In addition to prefix-list configuration 300 and route-map configuration 400, computing system 100 further maintains radix tree 107, which is generated based on prefix-list configuration 300 and route-map configuration 400. A radix tree is a data structure that represents a space-optimized prefix tree in which each node that is the only child is merged with its parent. In the example of radix tree 107, radix tree 107 includes prefix 110 that is representative of a root node and prefixes 111-114 that are representative of children nodes of prefix 110. In generating radix tree 107, computing system 100 may identify prefixes that are referenced in route-map configuration 400. Once the referenced prefixes are identified, computing system 100 may generate nodes for each of the prefixes and enter the nodes in radix tree 107. Once the prefixes are added to radix tree 107, computing system 100 may further associate one or more route-map clauses that correspond to the prefix. While demonstrated in the example of FIG. 1 with a single route-map clause associated with each prefix of prefixes 110-114, it should be understood that any number of route-map clauses may be associated with the prefixes based on route-map configuration 400. Once radix tree 107 is generated, computing system 100 may use the radix tree to determine how routes should be redistributed from the computing system.

Figure 2:
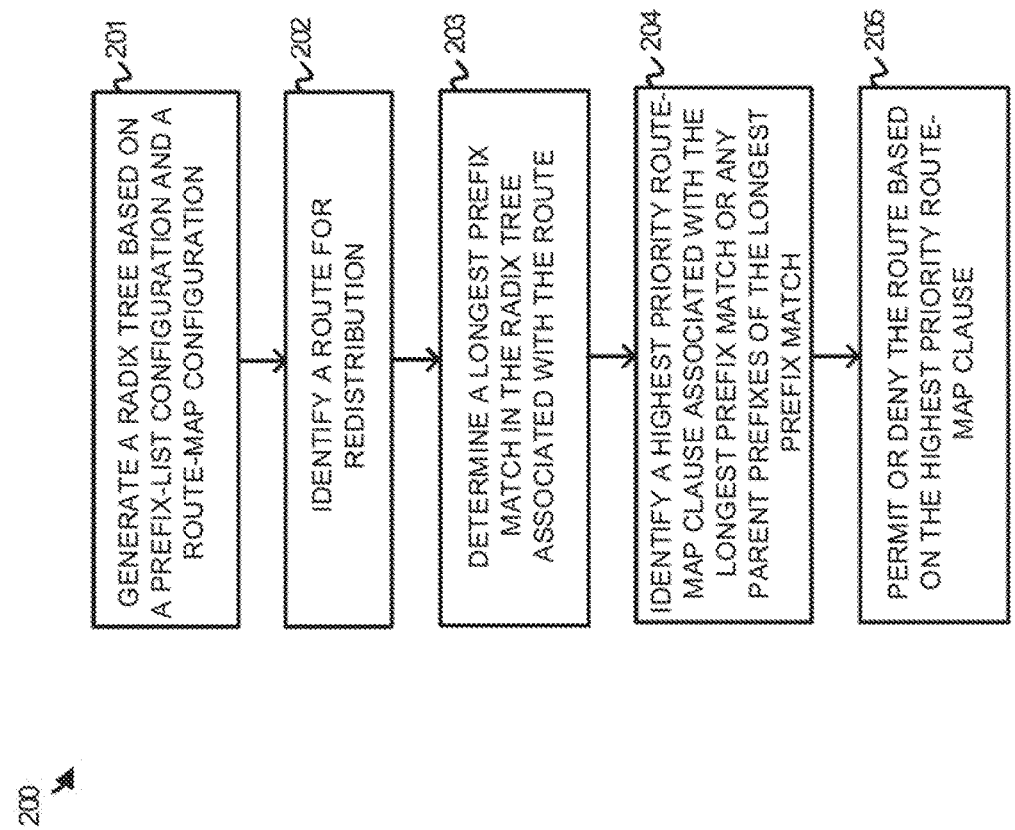
FIG. 2 illustrates an operation of a computing system to apply a route-map configuration according to an implementation.

FIG. 2 illustrates an operation 200 of a computing system to apply a route-map configuration according to an implementation. The processes of operation 200 are referenced parenthetically in the paragraphs that follow with reference to elements of computing system 100 of FIG. 1.

As depicted, operation 200 includes generating (201) a radix tree based on a prefix-list configuration and a route-map configuration. Prefix-list configurations and route-map configurations may be defined by an administrator to indicate how route redistributions should be handled for a computing network. In some implementations, prefix-list configurations may indicate one or more IP address prefixes and associate each of the prefixes with an identifier value, wherein the identifier value may comprise a numerical value, a variable, or some other identifier for the IP prefix. The identifier values may then be used by the route-map configuration to indicate whether various routes should be permitted or denied, where instead of using the IP prefix in the clause, the clause may use the arbitrary identifier value associated with the IP prefix (where multiple IP prefixes may share the same identifier value).

To generate the radix tree from prefix-list configuration 300 and route-map configuration 400, operation 200 may identify all IP prefixes that are referenced in route-map configuration 400. Once identified, a node may be added to radix tree 107 for each of the identified IP prefixes. Additionally, operation 200 may associate route-map clauses with corresponding prefixes in radix tree 107. For example, when prefix 110 is added to radix tree 107, computing system 100 may associate route-map clause with sequence "5" with the node as the IP prefix is referenced by the route-map clause. Although demonstrated in FIG. 1 with a single route-map clause per prefix, one or more prefixes may be associated with multiple route-map clauses in some examples. Additionally, while a route-map clause is associated with a single prefix in radix tree 107, it should be understood that a route-map clause may reference multiple prefixes in some instances. For example, a route-map clause may use an identifier to reference one or more IP prefixes in prefix-list configuration 300, wherein the identifier may be associated with multiple prefixes. As a result, the route-map clause may apply to multiple IP prefixes added to radix tree 107.

After generating the radix tree, operation 200 may identify (202) a route for redistribution in the computing network. The redistribution may correspond to OSPF, RIP, or some other protocol redistribution. Once identified, operation 200 may determine (203) a longest prefix match in the radix tree associated with the route. In some examples, when a redistribution request is obtained, computing system 100 may traverse radix tree 107 from bottom to top to identify the longest IP prefix match to the IP address included in the request. For example, a route redistribution request may include the IP address 192.0.2.49. Once the IP address is identified, computing system 100 may identify a longest prefix match in radix tree 107, which would correspond to prefix 114. After identifying the longest prefix, operation 200 may further identify (204) a highest priority route-map clause associated with the longest prefix match or any parent prefixes of the longest prefix match in the radix tree. Referring again to the example of IP address 192.0.2.49, the route-map clause associated with prefix 114 comprises a sequence value of "3." However, parent prefix nodes of prefix 114 in the graph are associated with sequence values "5," "2," and "1". Because the route-map clause with a sequence value of one is the highest priority clause, that route-map clause may be selected for IP address 192.0.2.49.

After identifying the highest priority route-map clause, operation 200 further permits (205) or denies the route based on the highest priority route-map clause. As described previously, each route-map clause may be associated with a sequence value, an IP prefix, and an action to be taken on a route for redistribution. Accordingly, when a route-map clause is identified to support a route, the action associated with the route-map clause may be applied to redistributed route. In the case of permitting a route, computing system 100 may initiate the required operations to implement the route redistribution, wherein the operations may include distributing the new route to one or more other computing systems or routers in the network.

In some examples, a new route that is identified by computing system 100 may not apply to any of the prefixes in a radix tree. For example, if a radix tree did not include a default prefix node (i.e., a node corresponding to 0.0.0.0/0), then one or more routes may be identified that do not apply to the radix tree. When these routes are identified, a default action may be applied to the route, wherein the action may be used to deny any route that is not defined in route-map configuration 400 or radix tree 107. In some instances, an administrator may define the action to be taken against IP addresses that fail to match a prefix in radix tree 107, wherein the action may be used to permit or deny the route.

In some examples, when the radix tree is generated from route-map configuration 400, the route-map configuration may include a clause that is not associated with a prefix-list match command or a clause that is associated with a non-existent prefix-list or prefix-list entry. When one of these conditions is identified, operation 200 may add a default prefix value to radix tree 107 and associate the route-map clause with the newly added prefix. This default prefix is represented in radix tree 107 as 0.0.0.0/0, where any packet that fails to apply to the other prefixes in the tree may default to prefix 110.

FIG. 3 illustrates a prefix-list configuration 300 according to an implementation. Prefix-list configuration is a sample prefix-list available to assist in generating radix tree 107. Prefix-list configuration 300 is represented as a table, however, it should be understood that the prefix-list may be represented in any other data structure or syntax form.

Prefix-list configuration 300 includes two columns, where a first column indicates IP prefixes corresponding to prefixes 110-114 and a second column that corresponds to list values 310-314. Prefixes 110-114 may be defined by an administrator and may be associated with a ranges of addresses to permit or deny based on route-map clauses. Associated with each of the prefixes are list values 310-314 that can be used as references for the route-map clauses. Thus, rather than referencing a prefix, the route-map clauses may reference a list value of list values 310-314, wherein the reference may comprise a numerical value, a variable value, or some other value.

In some implementations, prefix-list configuration 300 may be represented in a syntax that allocates an identifier to each of the prefixes. An example may be "ip prefix-list pl-2 seq 5 permit 192.0.2.0/25 le 32," wherein the prefix corresponds to a prefix "192.0.2.0/25 le 32" and the identifier or list-value corresponds to "5."

FIG. 4 illustrates a route-map configuration 400 according to an implementation. Route-map configuration 400 is an example configuration that can be used to generate radix tree 107 of FIG. 1. Although demonstrated in the example of FIG. 4 as a table, it should be understood that a route-map configuration may take the form of any data structure or command syntax.

In the example of route-map configuration 400, the data structure includes three columns. The first column corresponds to a route-map sequence, which corresponds to the priority associated with each of the route-map clauses. The second column indicates list-values 310-314 from FIG. 3, wherein each of the list-values correspond to a prefix value of prefixes 110-114. Although demonstrated in the example of FIG. 4 as including a single prefix associated with each of the list values, it should be understood that multiple prefixes may be associated with each of the list values. The third column is used to indicate an action associated with each of the route-map clauses, wherein the action may indicate operations to permit the route redistribution or deny the route redistribution.

As an example of applying route-map configuration 400, a routing computing system may identify a route for redistribution in the computing network. In response to identifying the route, the routing computing system may identify an IP address associated with the request and identify the highest priority (lowest sequence value) route-map clause that applies to the IP address. Once identified, the routing computing system may apply the corresponding action to the route.

In some examples, a route-map configuration may fail to include clauses for every IP address. For example, when a route redistribution is identified, the IP address may fail to apply to any of the prefixes in the route-map configuration. As a result, a default action may be defined that is applied to any IP address that fails to match a prefix in the route-map configuration. The default action may be to deny the route, permit the route, generate a notification or alert corresponding to the route, or provide some other default action in association with the route.

To assist in identifying route-map clauses associated with a route for redistribution, a routing computing system may generate a radix tree using the information from route-map configuration 400. In particular, the routing computing system may identify any prefixes used in the clauses for route-map configuration 400 and add the prefixes to a radix tree. Once added, route-map sequence information may be associated with each of the prefixes in the radix tree. As an example, route-map sequence "1" may be associated with prefix 112 based on the route-map configuration. Although demonstrated as associating a single route-map clause with each of the prefixes, it should be understood that multiple clauses may be associated in some examples.

Although demonstrated in the example of FIG. 4 as a table, it should be understood that the route-map configuration may be generated using various different syntaxes. In at least one example, a route-map configuration may be written using a matching syntax, which may be written as follows "route-map rm deny 1; match ip address prefix-list pl-3." This syntax indicates that any route will be denied when the sequence value is "1" and the prefix of the IP address corresponds to "prefix-list pl-3" or the third prefix in the prefix-list configuration.

Figure 5:
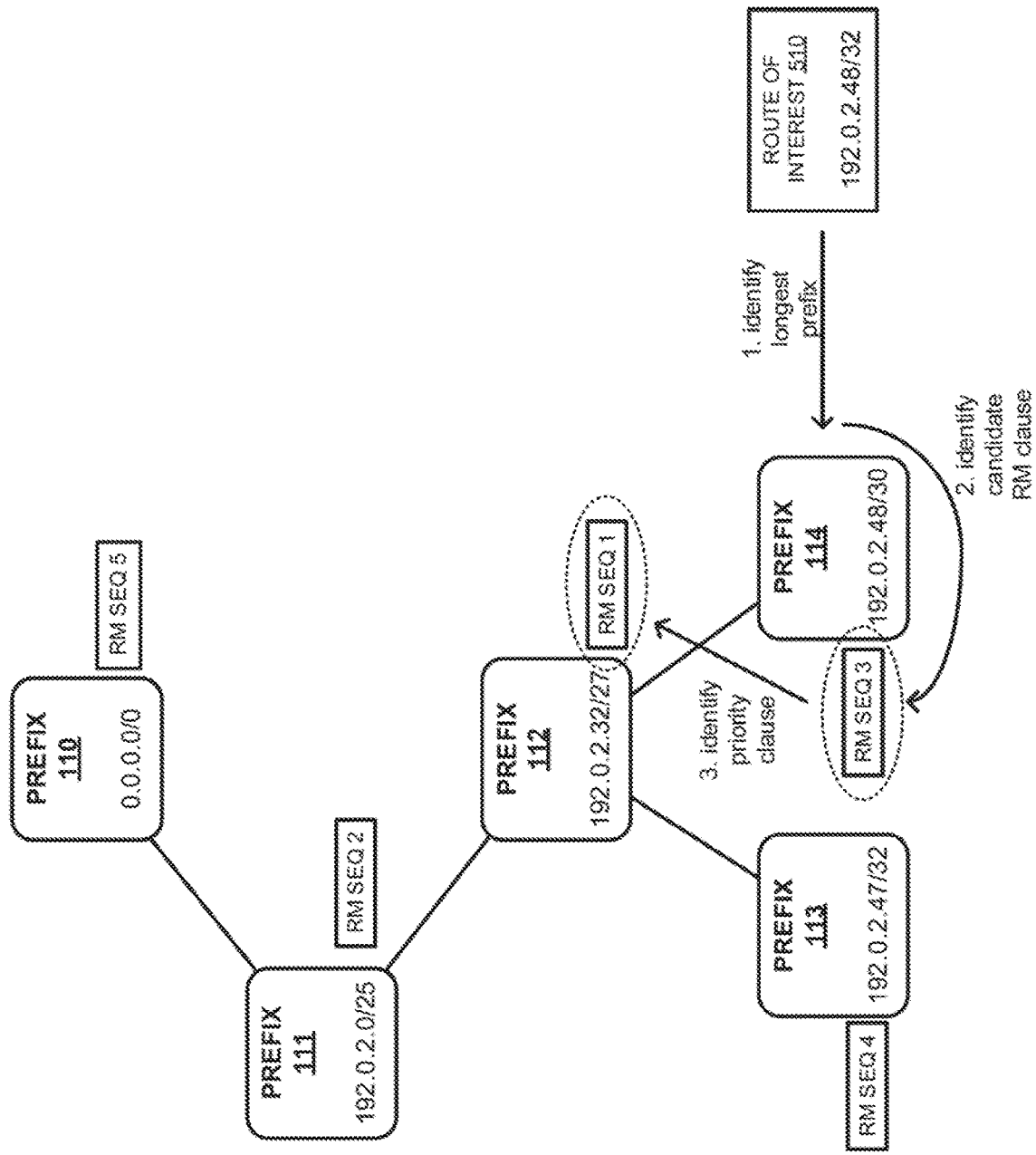
FIG. 5 illustrates an operational scenario of applying a radix tree according to an implementation.

FIG. 5 illustrates an operational scenario 500 of applying a radix tree according to an implementation. Operational scenario 500 includes nodes of radix tree 107 of FIG. 1.

As depicted a route of interest 510 is identified by a routing computing system for redistribution in a computing network. When route of interest 510 is identified, the computing system identifies the longest prefix in radix tree 107 that matches route of interest 510. In some implementations, the routing computing system may traverse radix tree 107 from longest prefix to shortest prefix to identify the longest prefix match in the tree. Here, the routing computing system determines, at step 1, the longest prefix corresponds to prefix 114. After identifying the longest prefix, the routing computing system identifies, at step 2, a candidate route-map clause that is associated with the longest prefix. In the current example, the route-map clause corresponds to a sequence value of "3." Once a candidate is identified, the routing computing system may upwardly traverse radix tree 107 to determine if any other route-map clauses are associated with a higher priority (lower sequence value) route-map clause. In some implementations, the routing computing system may analyze each of the parent prefixes of the longest prefix to determine if a route-map clause is associated with a lower sequence value. As a result, when looking at the parent of prefix 114, the routing computing system identifies, at step 3, a highest priority clause of sequence value "1" associated with prefix 112.

Once the highest priority clause is identified from the radix tree, the routing computing system may initiate operations to implement the action associated with the radix clause. Thus, if the action associated with the clause were to deny the distribution of the route, the computing system may prevent the route from being added to routing tables or communicated to other routing elements.

Figure 6:
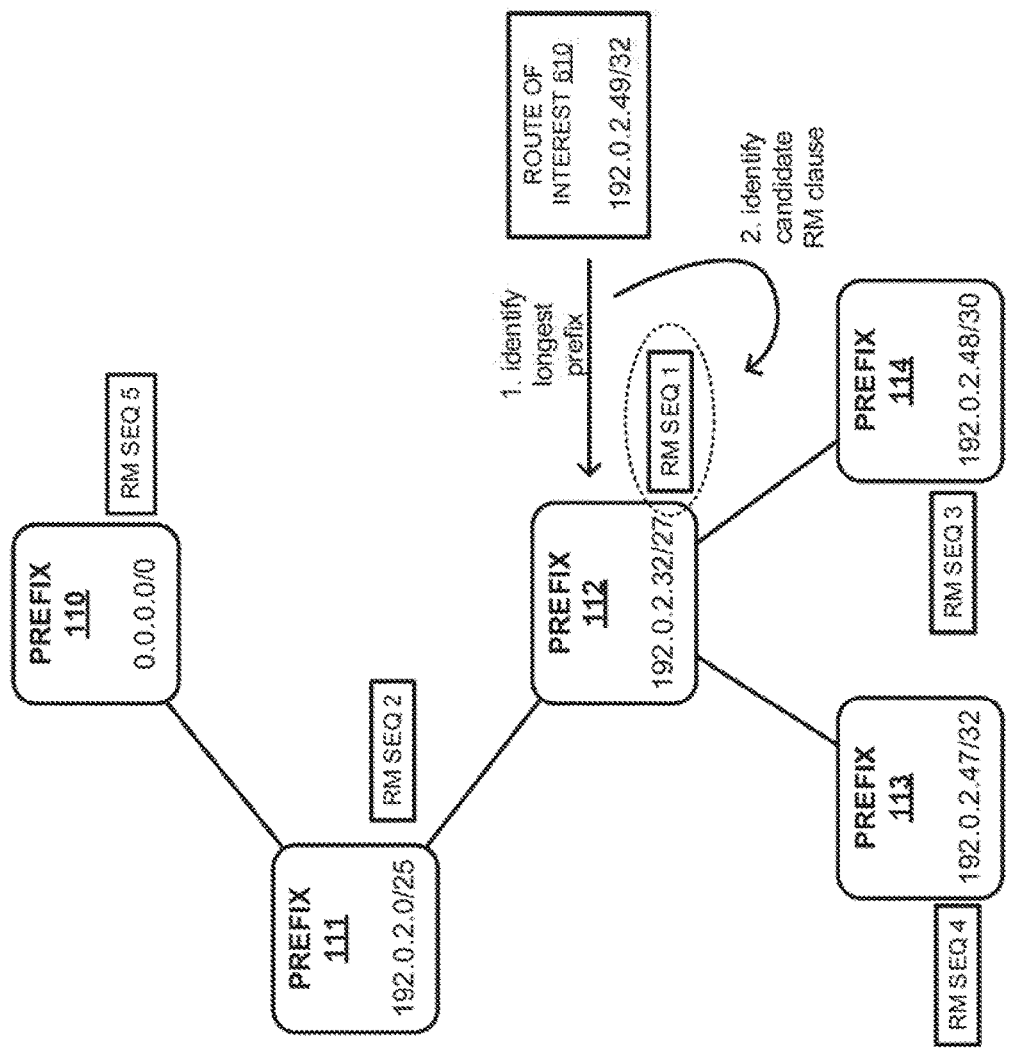
FIG. 6 illustrates an operational scenario of application a radix tree according to an implementation.

FIG. 6 illustrates an operational scenario 600 of applying a radix tree according to an implementation. Operational scenario 600 includes nodes of radix tree 107 of FIG. 1.

As described herein, to assist in processing route redistribution requests, a routing computing system may generate a radix tree from at least a route-map configuration. The radix tree includes nodes that represent various IP prefixes and the associated sequence values for route-map clauses. When route of interest 610 is identified by a routing computing system for redistribution, the routing computing system may identify, at step 1, the longest prefix in the radix tree that is associated with the route of interest. Once the prefix is identified, the routing computing system may identify, at step 2, a candidate route-map clause associated with the longest prefix. In the present implementation, prefix 112 is the longest prefix associated with route of interest 610 and prefix 112 corresponds to a route-map sequence value of "1." Because this route-map sequence value is of the highest priority value for the route-map configuration, the routing computing system may select the route-map clause to act on the redistribution of the IP address, wherein the action may include permitting the redistribution or denying the redistribution.

Although demonstrated in the examples of FIGS. 5 and 6 as identifying routes of interest that exist in the radix tree, it should be understood that some radix trees that are constructed from route-map configurations do not apply to all IP addresses that are identified for redistribution. As an example, a route-map configuration may not include a default clause that corresponds to the prefix 0.0.0.0/0. As a result, IP addresses that do not correspond to a prefix route within the radix tree may be allocated a default action based on preferences of an administrator associated with the network. The default action may include denying the route, notifying an administrator of the route, or implementing some other operation.

In some implementations, the route-map configuration may include one or more route-map clauses that are not associated with a prefix-list match command (i.e., a command to match to an IP prefix) or one or more route-map clauses that are associated with a non-existent prefix-list or prefix. When a clause is identified that corresponds to the previous criteria, the routing computing system may generate a default node in the radix tree and associate the default node with the route-map clause. Referring to an example in operational scenario 600, a route-map clause may fail to reference an existing prefix or prefix-list. Consequently, when the radix tree is generated for the route-map configuration, a default node may be added to the radix tree that corresponds to the prefix 0.0.0.0/0. The default node may then be used as the parent for the other prefixes identified in the route-map configuration.

Figure 7:
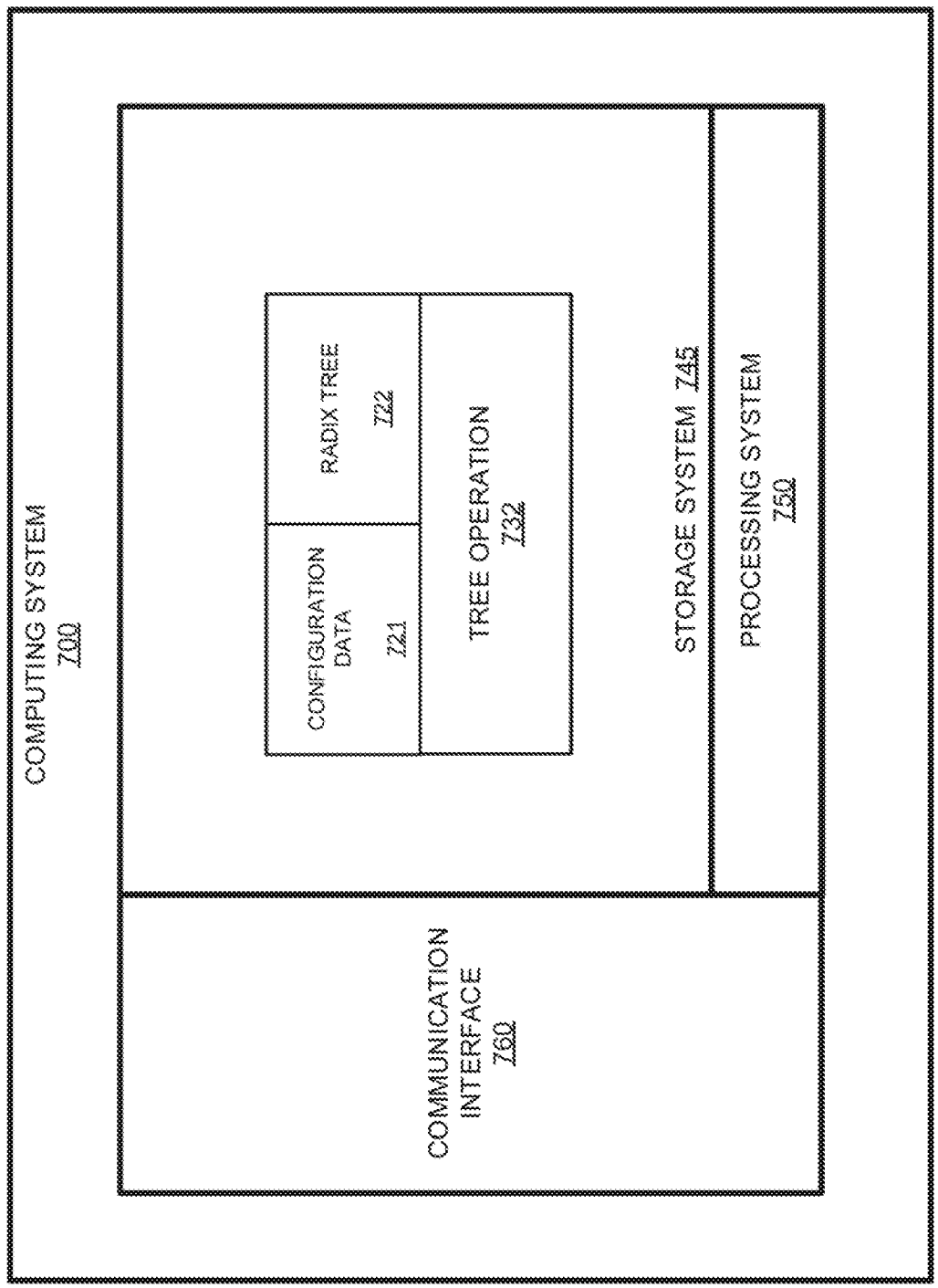
FIG. 7 illustrates a layout of a computing system according to an implementation.

FIG. 7 illustrates a layout of a computing system 700 according to an implementation. Computing system 700 is representative of any computing system or systems with which the various operational architectures, processes, scenarios, and sequences disclosed herein for a routing computing system can be implemented. Computing system 700 includes storage system 745, processing system 750, and communication interface 760. Processing system 750 is operatively linked to communication interface 760 and storage system 745. Communication interface 760 may be communicatively linked to storage system 745 in some implementations. Computing system 700 may further include other components such as a battery and enclosure that are not shown for clarity.

Communication interface 760 comprises components that communicate over communication links, such as network cards, ports, radio frequency (RF), processing circuitry and software, or some other communication devices. Communication interface 760 may be configured to communicate over metallic, wireless, or optical links. Communication interface 760 may be configured to use Time Division Multiplex (TDM), Internet Protocol (IP), Ethernet, optical networking, wireless protocols, communication signaling, or some other communication format—including combinations thereof. Communication interface 760 is an example of a physical network interface that can be configured to communicate with other computing systems to provide required operations for the processes executing on computing system 700.

Processing system 750 comprises microprocessor and other circuitry that retrieves and executes operating software from storage system 745. Storage system 745 may include volatile and nonvolatile, removable and non-removable media implemented in any method or technology for storage of information, such as computer readable instructions, data structures, program modules, or other data. Storage system 745 may be implemented as a single storage device but may also be implemented across multiple storage devices or sub-systems. Storage system 745 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing system 750 is typically mounted on a circuit board that may also hold the storage system. The operating software of storage system 745 comprises computer programs, firmware, or some other form of machine-readable program instructions. The operating software of storage system 745 comprises configuration data 721, radix tree 722, and tree operation 732. The operating software on storage system 745 may further include utilities, drivers, network interfaces, applications, or some other type of software. When read and executed by processing system 750 the operating software on storage system 745 directs computing system 700 to operate as described herein.

In at least one implementation, tree operation 732 directs processing system 750 to generate a radix tree 722 based on configuration data 721, wherein configuration data 721 may comprise a prefix-list configuration and a route-map configuration. In some implementations, to generate the radix tree, computing system 700 may consult a route-map configuration to identify IP prefixes referenced in the route-map configuration. Once the IP prefixes are identified, the IP prefixes are added as nodes to the radix tree. Additionally, the computing system may identify route-map clauses that are associated with each of the IP prefixes, wherein each of the IP prefixes may be associated with one or more route-map clauses. In some implementations, a priority value may be associated with each of the route-map clauses that indicates which clause should take priority of another clause. For example, a first clause may be associated with a first priority or sequence value that indicates that the clause should take precedence over any other clause in the route-map configuration.

In some examples, the route-map clauses in the route-map configuration may reference IP address prefixes that are stored in relation to the prefix-list configuration. In particular, rather than directly referencing the IP prefixes, the route-map clauses may reference values associated with each of the IP prefixes, wherein one or more of the values may be associated with multiple IP prefixes. In other examples, the route-map clauses may directly reference the IP address prefixes. Thus, rather than using a prefix-list configuration, the clauses in the route-map configuration may reference the IP prefixes for the redistribution actions.

In some implementations, the route-map configuration may include one or more clauses that fail to include a prefix-list match command or include a reference to a non-existent prefix-list configuration or prefix-list entry. When a clause is identified that satisfies the criteria, tree operation 732 may generate a default node for radix tree 722, wherein the default node may correspond to the prefix 0.0.0.0/0 or may correspond to some other default prefix. Once added, the default node may then be associated with the appropriate route-map clause or sequence number associated with the route-map clause.

After the radix tree is generated in association with the route-map configuration, tree operation 732 may identify a route for redistribution in a computing network. In response to identifying the route, which includes an IP address, tree operation 732 may determine the longest prefix in radix tree 722 that corresponds to route. Once the longest prefix is identified, tree operation 732 may identify a candidate route-map clause that is associated with the longest prefix. In some implementations, a prefix may be associated with multiple clauses. To select a candidate route-map clause for the longest prefix, tree operation 732 may identify the clause associated with the highest priority or the lowest sequence value. Once identified, tree operation 732 may traverse radix tree 722 to determine if any parent prefix of the longest prefix is associated with a higher priority route-map clause. For example, the longest prefix associated with a route may be associated with a sequence value of "5." However, a parent prefix of the longest prefix may be associated with a sequence value of "2." As a result, because the parent is associated with a lower sequence value or is of higher priority than the longest sequence, the route-map clause associated with the parent may be selected to handle the route.

In some implementations, routes may be identified by tree operation 732 that fail to correspond to a prefix that is in radix tree 722. For example, radix tree 722 may fail to include a default node that corresponds to a catch all prefix of 0.0.0.0/0. Accordingly, when a route is identified for redistribution that fails to match any of the prefixes in radix tree 722, tree operation 732 may implement a default action. In some examples, the default action may correspond to denying the route redistribution. In other examples, an administrator may select to permit or deny routes that fail to match any prefix in radix tree 722.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method comprising:
   identifying a route for redistribution in a computing network;
   determining a longest prefix in a radix tree associated with the route;
   identifying a route-map clause associated with the longest prefix;
   identifying one or more additional route-map clauses each associated with a parent prefix of one or more parent prefixes of the longest prefix match in the radix tree;
   identifying a highest priority route-map clause from the route-map clause and the one or more additional route map clauses; and
   initiating an action associated with the highest priority route-map clause.

2. The method of claim 1, wherein the route comprises an IP address.

3. The method of claim 1 further comprising generating the radix tree based on at least a route-map configuration for the computing network, wherein the route-map configuration comprises one or more route-map clauses.

4. The method of claim 3, wherein the radix tree is further generated based on a prefix-list configuration.

5. The method of claim 4, wherein generating the radix tree comprises:
   generating a node in the radix tree for each prefix in the prefix-list configuration associated with at least one route-map clause of the one or more route-map clauses; and
   allocating at least one route-map clause of the one or more route-map clauses to each of the nodes in the radix tree based on the route-map configuration.

6. The method of claim 5, wherein generating the radix tree further comprises generating a default route node when a route-map clause is not associated with a prefix-list match command or when a route-map clause is associated with a non-existent prefix-list.

7. The method of claim 1 further comprising:
   determining when a prefix in the radix tree applies to the route;
   when a prefix in the radix tree applies to the route, determining the longest prefix in the radix tree associated with the route; and
   when a prefix in the radix tree fails to apply to the route, denying the route.

8. The method of claim 1, wherein the action comprises permitting or denying the route.

9. A computing apparatus comprising:
   a storage system;
   a processing system operatively coupled to the storage system;
   program instructions stored on the storage system that, when executed by the processing system, direct the processing system to:
      identify a route for redistribution in a computing network;
      determine a longest prefix in a radix tree associated with the route;
      identify a route-map clause associated with the longest prefix;
      identify one or more additional route-map clauses each associated with a parent prefix of one or more parent prefixes of the longest prefix match in the radix tree;
      identify a highest priority route-map clause from the route-map clause and the one or more additional route map clauses; and
      initiate an action associated with the highest priority route-map clause.

10. The computing apparatus of claim 9, wherein the route comprises an IP address.

11. The computing apparatus of claim 9, wherein the action comprises permitting or denying the route.

12. The computing apparatus of claim 9, wherein the program instructions further direct the processing system to generate the radix tree based on at least a route-map configuration for the computing network, wherein the route-map configuration comprises one or more route-map clauses.

13. The computing apparatus of claim 12, wherein the radix tree is further generated based on a prefix-list configuration.

14. The computing apparatus of claim 13, wherein generating the radix tree comprises:
   generating a node in the radix tree for each prefix in the prefix-list configuration associated with at least one route-map clause of the one or more route-map clauses; and
   allocating at least one route-map clause of the one or more route-map clauses to each of the nodes in the radix tree based on the route-map configuration.

15. The computing apparatus of claim 14, wherein generating the radix tree further comprises generating a default route node when a route-map clause is not associated with a prefix-list match command or when a route-map clause is associated with a non-existent prefix-list.

16. The computing apparatus of claim 9, wherein the program instructions further direct the processing system to:
- determine when a prefix in the radix tree applies to the route;
- when a prefix in the radix tree applies to the route, determine the longest prefix in the radix tree associated with the route; and
- when a prefix in the radix tree fails to apply to the route, deny the route.

17. An apparatus comprising:
- a storage system;
- program instructions stored on the storage system that, when executed by a processing system, direct the processing system to:
  - identify a route for redistribution in a computing network;
  - determine when a prefix in the radix tree applies to the route;
  - when a prefix in the radix tree fails to apply to the route, deny the route; and
  - when a prefix in the radix tree applies to the route:
    - determine the longest prefix in the radix tree associated with the route;
    - identify a route-map clause associated with the longest prefix;
    - identify one or more additional route-map clauses each associated with a parent prefix of one or more parent prefixes of the longest prefix match in the radix tree;
    - identify a highest priority route-map clause from the route-map clause and the one or more additional route map clauses; and
    - initiate an action associated with the highest priority route-map clause.

18. The apparatus of claim 17, wherein the route comprises an IP address.

19. The apparatus of claim 17, wherein the action comprises permitting or denying the route.

20. The apparatus of claim 17, wherein the program instructions further direct the processing system to generate the radix tree based on at least a route-map configuration for the computing network, wherein the route-map configuration comprises one or more route-map clauses.

* * * * *